INVENTOR.
Walter A. Scott.

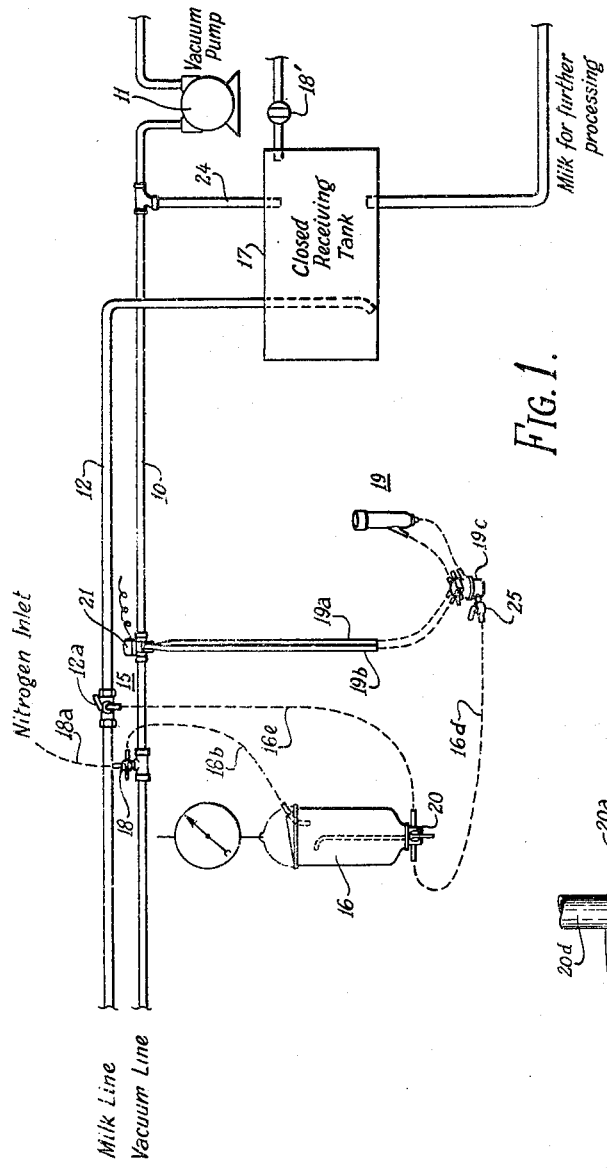
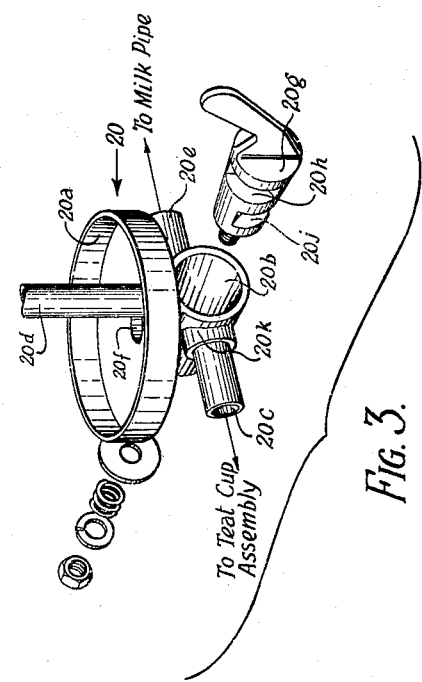

Patented Feb. 2, 1954

2,667,855

UNITED STATES PATENT OFFICE 2,667,855

AIRTIGHT MILKING MACHINE

Walter A. Scott, Poughkeepsie, N. Y., assignor to The De Laval Separator Company, Poughkeepsie, N. Y., a corporation of New Jersey Application August 21, 1952, Serial No. 305,579

8 Claims. (Cl. 119—14.01)

This invention relates to an improvement in cow milking machines whereby the milk received from the cow's teats will be maintained in its original sterile condition without contact with air or other contaminating media.

Milk sanitarians long have recognized that the milk received from the teats of a healthy cow is sterile and that subsequent contact with air alone is sufficient to bring about a substantial accumulation of bacteria in the milk. It is to overcome this bacterial growth that pasteurization of the milk is practiced. However, the use of such a practice to a degree which results in returning milk to its original sterile condition leaves the milk with an undesirable flavor or burnt taste. Recently a method of handling milk during the milking operation and subsequent packaging operations has been developed and practiced on a small scale under substantially sterile laboratory conditions which has resulted in the complete avoidance of pasteurization of the milk. In this way, a large monetary saving through the avoidance of a need for expensive pasteurizing equipment, as well as the operation and labor charges incident to the use of the equipment, are effected. The laboratory-like small scale milking operation as it is presently being practiced has shown that the milk must be handled in sterile equipment and maintained free from contact with air at all times. Such a finding indicates that the "pipe line" or "combine" type milking equipment such as is disclosed in Hapgood Patent No. 1,846,805 is particularly adaptable to the practice of sterile milking. However, the equipment according to the Hapgood patent, and other arrangements of a similar nature, require that air at atmospheric pressure be admitted to the system during certain cycles in their operation.

The usual "pipe line" or "combine" milker of the type disclosed in the aforementioned Hapgood patent includes teat cups, a milk receiving pail having a milk inlet and a milk outlet, a pipe line connected to a source of vacuum, a milk pipe line, and a valve means and associated conduits to connect through certain of the conduits the milk inlet of the pail with the teat cups and the upper part of the pail with the vacuum pipe, and alternately therewith to connect through certain of the conduits the upper part of the pail with atmosphere, the vacuum line with the milk pipe line, and the milk outlet from the pail with the milk pipe line (see Figs. 1, 4, 5 and 8 of the Hapgood patent). From an inspection of this system two possible sources of contamination of the milk through contact with air are evident, one through the connection between the milk pipe and the vacuum pipe, and the other through the connection between the upper part of the pail and atmosphere.

It is therefore the object of this invention to provide means in conjunction with a milking machine whereby the milk will be freed from contact with air or other source of contamination during the milking and collecting operations at the milking site.

A milking machine according to the present invention comprises a closed milk receiving pail which is provided with valve means for selectively connecting the interior of the pail with either a milk receiving conduit or with teat cups operated in the well known manner from a vacuum line. An inert gas, such as nitrogen, under pressure is supplied from a source having control means connecting with the milk pail so that the pail, valve means, teat cups and milk receiving conduit are charged with sterile inert gas, the control means alternatively connecting the milk pail with the vacuum line to draw milk from the teat cups into the milk pail. Upon the completion of the milking, the valve and control means are reset to reintroduce the inert gas under pressure into the milk pail thus forcing the milk from the pail into the milk receiving conduit.

These and other objects and aspects of my invention will be apparent from the following description of the presently preferred specific embodiment of the invention which refers to drawings wherein:

Fig. 1 is an elevational view, partly schematic, of a complete milking machine;

Fig. 3 is an enlarged perspective exploded view of the main control valve affixed at the bottom of the milk receiving pail.

Figure 2:
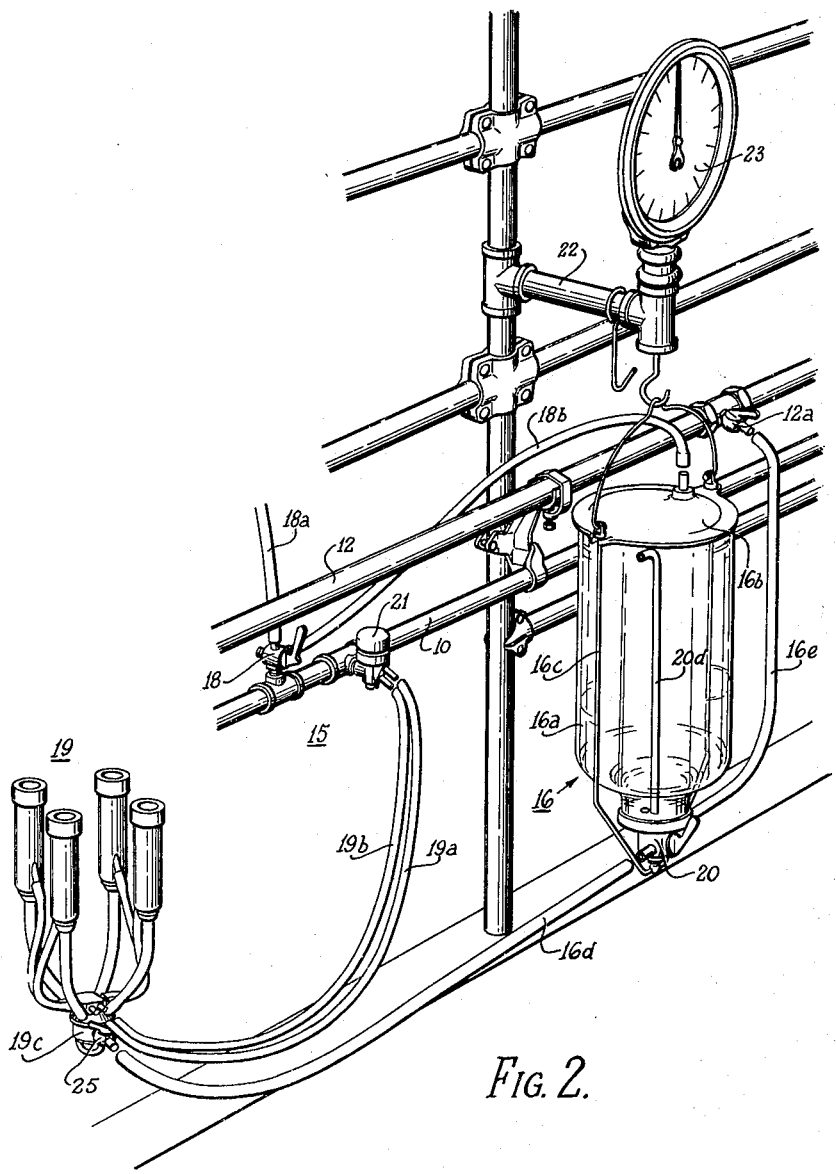
Fig. 2 is an enlarged perspective view of the arrangement of the equipment at each milking station.

The milking apparatus shown in Fig. 1 comprises a vacuum line such as the pipe 10 communicating with a vacuum pump 11, and a milk pipe 12 terminating in an insulated and sealed milk receiving tank 17, at intervals along which pipes are located one or more milking stations 15. A source (not shown) of a sterile inert gas, such as nitrogen, under pressure is brought to a nitrogen control valve 18 located at each of the milking stations 15 by means of a pipe 18a.

The vacuum line 10 may be made up of ordinary iron pipe or any other type of piping available since it is not in contact with the milk at any time. Its only requirement is that it be vacuum tight. The vacuum pump 11 may be of any of the commercially available types marketed for this purpose. Those portions of the apparatus with which the milk is in contact are fabricated of stainless steel or rubber in order that they may be kept clean and sterile by any one of several accepted practices. However, it is preferred that the milk pipe line 12 and the milk receiving pail 16 be of a transparent material such as glass in order that a constant visual check may be made during the milking operations.

Each milking station 15 (see Fig. 2) includes a teat cup assembly 19; a milk receiving pail 16 adapted to receive the milk from the teat cup assembly 19 affixed to the cow being milked, the pail having at the base thereof a main transfer valve 20 whereby the milk received from the cow is first directed into the pail, and then, at the completion of the physical milking act, directed from the pail to the milk pipe by means of a flexible milk receiving conduit 16e; flexible hose connections 19a and 19b, and 16d between the vacuum line 10 and the teat cup assembly 19, and between the teat cup assembly and the milk receiving pail 16, respectively; and nitrogen control valve 18 having a hose connection 18b from one of its alternative through passages to the milk receiving pail 16, the other of the through passages of the nitrogen valve 18 being tapped directly into the vacuum line 10. Each milking station also includes a pulsator 21 (see Hapgood Patent No. 1,854,305) and claw assembly 19c (see Leitch Patent No. 1,255,186) interconnected by the aforementioned flexible conduits 19a and 19b by means of which the teat cups 19 are caused to function in a known manner. A bracket 22 and weighing scale 23 are preferably included also at each milking station.

The milk receiving pail 16 includes a glass body 16a confined between a metal plate 16b at its upper end and the flanged top 20a of the main transfer valve 20 (shown in detail in Fig. 3), and may be conveniently supported directly from bracket 22 or the weighing scale 23 attached thereto.

The main transfer valve 20 (see Fig. 3) is held secure in a sealed relation against the open lower end of the milk receiving pail 16 by a plurality of rods 16c extending along the outside of the pail between the underside of valve housing 20k and the upper metal plate 16b. The valve housing contains a conical chamber 20b having a connection to a nipple 20c and standpipe 20d at one end and a further connection to nipple 20e and the opening 20f adjacent the standpipe 20d on the exterior of the housing 20a at the other end thereof. Nipple 20c is connected to the flexible conduit 16d leading to the teat cup assembly 19 and nipple 20e is connected to the flexible conduit 16e leading to the milk cock 12a in milk pipe 12. The valve plug 20g, operable within the chamber 20b, has an arcuate slot such as the channel 20h by means of which nipple 20c and the standpipe 20d are placed in communication, and alternatively, a second arcuate slot or channel 20j whereby the nipple 20e and the housing opening 20f are interconnected. The plug 20g is removably held within the chamber 20b by means of an axial tension spring and a nut cooperating with the threaded end of the plug.

The nitrogen control valve 18 is tapped into and mounted on the vacuum line 10 as shown in Figs. 1 and 2, and is of the standard two-way type having a ground joint between the valve housing and the valve plug. An example of such a valve is disclosed in Beckman Patent No. 1,757,035. The valve is operable to connect by means of one of its through passages a supply of nitrogen gas at atmospheric pressure (or slightly above) delivered through the pipe 18a to the interior of the milk receiving pail 16, or alternatively, by means of its other through passages to connect the interior of the pail to the vacuum line 10 via the flexible rubber conduit 18b.

In the use of the improved milking machine at a milking station such as that shown best in Fig. 2, the complete system must first be charged with an inert gas, preferably nitrogen. This is accomplished by first turning the plug 20g of transfer valve 20 so that opening 20f and nipple 20e are interconnected by channel 20j; then, practically closing the milk cock 12a leading to the milk pipe 12; and finally turning the nitrogen valve 18 to interconnect pipe 18a and conduit 18b. The inert gas will then flow into and fill the milk receiving jar 16 and conduit 16e. The milk cock 12a is then completely closed and the plug of transfer valve 20 turned to a position in which channel 20h interconnects the standpipe 20d via conduit 16d to the teat cup assembly 19, thus completing the charging of the passages through which milk will flow once the actual milking operation begins. With experience, an operator is able to judge with good accuracy the time interval between valve openings and closings to insure the full charging of the system. The higher the nitrogen pressure, the shorter the time interval which will be required. As soon as the system is fully charged, the pulsator and conduits 19a and 19b are connected to the vacuum line 10 and the teat cups placed on the cow's teats; then the nitrogen valve 18 is turned to interconnect conduit 18b to the vacuum line 10. Since the pressure in the vacuum line 10 and the now interconnected milk receiving pail 16 is reduced by vacuum pump 11, the milk withdrawn from the cow by the teat cups flows through conduit 16d and into the pail 16 displacing the nitrogen ahead of it into the vacuum line 10 through conduit 18b.

At the conclusion of the flow of milk from the cow the transfer and control valves are reset, the transfer valve 20 being turned so that channel 20j of the valve plug 20g interconnects the interior of the pail 16 via passage 20f with conduit 16e; the nitrogen control valve 18 next being turned to interconnect pipe 18a and conduit 18b. The milk cock 12a is then opened to connect the conduit 16e with the milk line 12. The admission of the inert gas from pipe 18a forces the milk in pail 16 into the milk line. As the milk leaves the jar and conduit 16e, its mass is replaced by the inert gas and the milking cycle is completed with the system recharged and made ready for the milking of the next cow.

From the foregoing description of the mode of operation of the improved milking machine, it will be apparent that air is not in contact with the milk at any time, but rather that the contact of the milk is with an inert gas which, during the actual milking, is exhausted by the vacuum pump ahead of the milk flow. The passage of the milk from the receiving pail 16 to the collecting station 17 is accomplished by the use of the inert gas under pressure. Any of the gas which might become mixed with the milk as it flows through conduit 16e and the milk pipe 12, is accumulated in the receiving tank 17 and exhausted therefrom by a branch connection 24 to the vacuum line 10.

In the collection of the milk from the milking source, for further processing at a remote packaging plant, it is preferred that the collecting tank 17 be removed from the farm as a unit. Automatic shut-off connections may be arranged in the milk line 12, and the vacuum line branch pipe 24 to facilitate this object. Should the milk be collected in a tank-type truck, an additional nitrogen valve 18' may be arranged in the farm collecting tank 17 whereby the inert gas under pressure is utilized to effect a transfer of the milk from the farm tank to the carrier tank and, at the same time continue the milk out of contact with air or other possible contaminants.

If desired, a valve 25 may be used as a permanent connection between the milker claw 19c and the hose 16d, so that when the latter has been charged with nitrogen as previously described the valve 25 can be closed to prevent escape of nitrogen until the teat cups 19 are being applied to the cow, at which time the valve 25 is opened until the teat cups are to be removed. Each time the teat cups are to be re-applied, the valve 25 can be opened slightly to determine whether the hose 16d is charged with nitrogen, since the nitrogen will then cause a hissing noise if the hose is charged.

I claim:

1. In a milking machine of the type having teat cups operated from a vacuum line, a milk receiving conduit, a closed milk receiving pail, transfer valve means connected to the pail, conduits connecting the valve means with the teat cups and the milk conduit, respectively, and through which the interior of the pail is connected selectively with the teat cups or with the milk receiving conduit in different positions of the valve means, a source of an inert gas under pressure, control means communicating with the pail and having connections with said source and with the vacuum line, and an adjustment member connected to the control means and operable in one position to connect said source and pail through the control means and one of said connections, whereby the pail, valve means, teat cups and milk receiving conduit can be charged with inert gas, the adjustment member having a second operating position in which the control means disconnect the milk pail from said source and connect the pail with the vacuum line through the other of said connections so that milk from the teat cups can be drawn into the pail, the valve and control means being operable upon completion of the milking to reintroduce inert gas under pressure into the milk pail and thus force the milk from the pail into the milk receiving conduit, whereby the milk does not come into contact with the atmosphere during any portion of the milking cycle.

2. In a milking machine of the type having teat cups operated from a vacuum line, a milk receiving conduit, a closed milk receiving pail having a transfer valve in the bottom thereof, conduits leading from said valve to said teat cups and the milk receiving conduit respectively so that the milk pail can be selectively connected therewith, a source of an inert gas under pressure having a two-position control valve, a conduit connecting said control valve with said milk pail to charge said pail, transfer valve, teat cups and milk receiving conduit with inert gas in a first position of said control valve, the control valve also having a connection with the vacuum line and through which, in the order position of the control valve, the milk pail is connected to said vacuum line to draw milk from the teat cups into the pail, the control valve being returned to its first position and the transfer valve reset upon the completion of the milking to reintroduce inert gas under pressure into the milk pail thus forcing the milk from the pail into the milk receiving conduit whereby the milk does not come into contact with the atmosphere during any portion of the milking cycle.

3. A milking machine according to claim 2 wherein the conduits are flexible tubes.

4. A milking machine according to claim 2 wherein the control valve is inserted in the vacuum line.

5. A milking machine according to claim 2 wherein the transfer valve has a standpipe extending up into said pail and an aperture opening into the bottom thereof, the conduits to said teat cups and said milk conduit being alternatively connected to said standpipe and said aperture respectively by operation of said valve.

6. A milking machine according to claim 5 wherein the transfer valve has a body adapted to close the opening in the bottom of the milk pail, said body including nipples for connecting with the conduits to the teat cups and milk conduit respectively and a conical plug having two axially spaced arcuate slots therein, said slots being radially disposed so that rotation of the plug alternatively connects the standpipe to the teat cup or the aperture with the milk receiving conduit.

7. A milking machine according to claim 2 wherein the milk receiving line terminates in a closed tank which is connected to said vacuum line to eliminate the inert gas from the milk.

8. A milking machine according to claim 2 wherein a valve is interposed adjacent the teat cups in the conduit to the transfer valve to prevent the escape of inert gas after the charging operation.

WALTER A. SCOTT.

References Cited in the file of this patent
UNITED STATES PATENTS

| Number | Name | Date |
|---|---|---|
| 1,197,717 | Disbrow | Sept. 12, 1916 |
| 1,825,645 | Martin, Jr. | Sept. 29, 1931 |
| 2,616,809 | Graves | Nov. 4, 1952 |